United States Patent [19]

Stevens

[11] Patent Number: 4,533,508

[45] Date of Patent: Aug. 6, 1985

[54] METAL OXIDE FIBERS FROM ACRYLATE SALTS

[75] Inventor: Rex R. Stevens, Midland, Mich.

[73] Assignee: The Dow Chemical Company, Midland, Mich.

[21] Appl. No.: 525,383

[22] Filed: Aug. 22, 1983

[51] Int. Cl.$^3$ .............................................. C04B 35/64
[52] U.S. Cl. ......................................... 264/22; 264/63; 264/176 F; 264/234
[58] Field of Search ................ 264/63, 22, 176 F, 234

[56] References Cited

U.S. PATENT DOCUMENTS

| | | | |
|---|---|---|---|
| 2,847,314 | 8/1958 | Fisher | 106/39 |
| 3,385,915 | 5/1968 | Hamling | 264/0.5 |
| 3,652,749 | 3/1972 | Sobel | 264/63 |
| 3,775,352 | 11/1973 | Leonard . | |
| 3,808,015 | 11/1976 | Seyfert | 106/65 |
| 3,846,527 | 11/1974 | Winter et al. | 264/63 |
| 3,853,688 | 12/1974 | D'Ambriosio | 264/63 |
| 3,992,498 | 11/1976 | Morton et al. | 264/63 |
| 4,010,233 | 3/1977 | Winter et al. | 264/63 |
| 4,071,594 | 1/1978 | Pearson | 264/63 |
| 4,246,254 | 1/1981 | Miyata et al. | 423/635 |

FOREIGN PATENT DOCUMENTS

| | | |
|---|---|---|
| 1249832 | 9/1967 | Fed. Rep. of Germany . |
| 1402544 | 8/1965 | United Kingdom . |
| 1360197 | 7/1974 | United Kingdom . |
| 1360198 | 7/1974 | United Kingdom . |
| 1360199 | 7/1974 | United Kingdom . |
| 1360200 | 7/1974 | United Kingdom . |

*Primary Examiner*—James Derrington
*Attorney, Agent, or Firm*—Paul D. Hayhurst

[57] ABSTRACT

An improved process for the preparation of metal oxide fibers, which process employs the acrylate salt of the metal.

9 Claims, No Drawings

METAL OXIDE FIBERS FROM ACRYLATE SALTS

BACKGROUND OF THE INVENTION

The present invention relates to a method of preparing refractory fibers. More specifically, it relates to an improved method of preparing metal oxide fibers.

Energy conservation efforts by industry in recent years have led to a 20 percent annual growth rate (from 1976-1982) in the use of ceramic fibers for high temperature insulation applications. Furnace lining products fabricated from ceramic fibers have a much lower heat capacity and are much better insulators than traditionally used dense firebrick refractories. Hot face replacement of firebrick with a fibrous refractory lining can reduce thermal conductivity by more than 50 percent, and the lower heat capacity of the fibrous refractory lining reduces heat-up costs and allows faster heating-/cooling cycle rates.

Currently available ceramic fiber refractory products, which are fabricated mainly from aluminosilicate or alumina fibers, cannot be used at temperatures above approximately 1600° C. Products made from fibrous zirconia are useful at temperatures up to 2200° C. but are too expensive for normal industrial furnace lining applications. The cost (1982) of bulk ceramic fibers, which increases significantly with maximum service temperature (mst), is $1–3/lb for typical aluminosilicates (1260° C. mst), $5/lb for mixed aluminosilicate-/$Al_2O_3$ products (1480° C. mst), $22/lb for $Al_2O_3$ (1600° C. mst), and $47/lb for $ZrO_2$ (2200° C. mst). The cost/performance data on currently available fibrous ceramic products indicates a need in the marketplace for a ceramic fiber material that can be used in the temperature range 1600° C.–2200° C. and sell at a price competitive with $Al_2O_3$ fibers. MgO fibers (mp 2800° C.) could be used at temperatures of at least 2200° C. but could have a significantly lower raw material cost than either $ZrO_2$ or $Al_2O_3$ fibers.

SUMMARY OF THE INVENTION

The present invention is an improved process for the production of metal oxide fibers. The process is especially beneficial in the production of magnesium oxide fibers. The following steps are included in the process:
(a) preparing a composition comprising an aqueous solution of a metal acrylate and a water-soluble organic polymer, the proportion by weight of the metal acrylate being greater than the proportion by weight of the organic polymer;
(b) preparing a green fiber from the composition of (a); and
(c) treating the green fiber under conditions such that the organic matter is removed from the fiber and a metal oxide fiber is produced.

Surprisingly, the use of a metal acrylate salt provides an improvement over the metal salts typically employed in the preparation of metal oxide fibers.

DETAILED DESCRIPTION OF THE INVENTION

The process of the present invention advantageously employs an aqueous solution of a metal acrylate and a water-soluble organic polymer.

The metal acrylate is the salt of a metal cation and an acrylate anion. The acrylate anion may be any anion having the acrylate group:

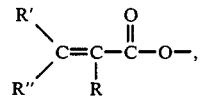

wherein R, R' and R" are independently lower alkyl, including lower alkyl moieties having inert substituents, H, or other inert substituents. Preferably, R, R' and R" are independently H or lower alkyl of from 1 to about 3 carbon atoms. Methacrylate is an example of a preferred acrylate anion. Most preferably, R, R' and R" are H. If desired, mixtures of acrylate anions may be employed. The key requirement of the metal acrylate is that it must be soluble in the solution medium which preferably is water. For the purposes of the present invention, the metal acrylate is soluble in water, or the solution medium, if it is capable of forming a true solution or a colloidal solution with, respectively water, or the solution medium.

A cation-providing metal is advantageously employed in the process of the present invention. Typically, the metal may be any metal, the oxide or hydroxide of which will react with acrylic acid, or derivatives thereof, to form a metal acrylate compound which is soluble in the solution medium. Suitable cation-providing metals include calcium, magnesium, aluminum, zirconium, iron, chromium, nickel, vanadium, manganese, cobalt and mixtures thereof. Magnesium is the preferred metal.

While water is by far the preferred medium of the solution of metal acrylate and organic polymer, it is possible to include other polar solvents in the solution. Typical polar solvents include alcohols, such as methanol and ethanol, dimethylsulfoxide, dimethylformamide, and mixtures thereof.

The organic polymer is preferably a water-soluble organic polymer, conveniently a nonionic water-soluble organic polymer, a polyhydroxylated organic polymer or a natural water-soluble gum. The organic polymer is preferably thermally stable under the conditions of fiberizing, for example, from ambient temperature to within several degrees of the boiling point of the solution. Examples of preferred organic polymers include: partially hydrolyzed polyvinyl acetate; polyvinyl alcohol; polyacrylamide and partially hydrolyzed polyacrylamide; polyacrylic acids; polyethylene oxides; carboxyalkyl celluloses, for example carboxymethyl cellulose; hydroxyalkyl celluloses, for example hydroxymethyl cellulose; alkyl celluloses, for example methyl cellulose; hydrolyzed starches; dextrans; guar gum; polyvinyl pyrrolidones; polyethylene glycols; alginic acids; polyisobutylene derivatives; polyurethanes; and esters, copolymers or mixtures thereof. The most preferred organic polymers are straight-chain polyhydroxylate organic polymers, for example polyvinyl alcohol, partially hydrolyzed polyvinyl acetate, polyethylene oxide or polyethylene glycol.

Conveniently the molecular weight of the organic polymer is in the range $10^3$ to $10^7$, preferably as high a molecular weight as is consistent with the ability of the organic polymer to dissolve in the solvent used in the process of the invention. For example, it is preferred for the polyvinyl alcohol or partially hydrolyzed polyvinyl acetate to have a medium or high molecular weight, the polyethylene oxide to have a molecular weight of $10^4$ to $10^6$ and the polymers derived from cellulose to have a molecular weight of 10,000 to 50,000. It is preferred that the concentration of organic polymer in the fiberizing composition be from 0.1 percent to 2 percent by weight.

Preferably the proportion by weight of the metal compound in the said composition is greater than the proportion by weight of the organic polymer, for example when there is at least twice as much metal compound as there is organic polymer. More preferably the organic polymer comprises less than 10 percent by weight of the metal compound, for example from 2 percent to 8 percent by weight, or in some embodiments from 0.1 percent to 2 percent by weight.

It is preferred that little or no chemical reaction should occur between the metal compound and the organic polymer in the fiberizing composition.

The viscosity of the fiberizing composition is preferably one suited to the fiberizing method employed. Conveniently, the viscosity is in the range 1 to 3000 poise, preferably 100 to 1000 poise, especially when fiberizing is effected by extrusion of the composition through a spinneret to form a continuous filament. Fiberizing of compositions of low viscosity, for example 1 to 100 poise, is preferably carried out by a blowing process as hereinafter described.

Fiberizing may be carried out by any convenient method, for example by centrifugal spinning, drawing, blowing or extrusion through a spinneret. Fiberizing by extrusion through a spinneret is especially useful in producing continuous fiber. Fiberizing is most conveniently carried out at the ambient temperature, but if desired it may be carried out at any other temperature at which the fiberizing composition is stable. For example, it may be convenient in some embodiments to vary the temperature in order to produce the viscosity of the composition appropriate for fiberizing.

Fiberizing by blowing comprises extruding the fiberizing composition through one or more apertures into at least one gas stream having a component of high velocity in the direction of travel of the extruded composition. The dimensions and shape of the said aperture may vary widely. It is preferred to use an aperture having at least one dimension larger than 50 microns and smaller than 500 microns. The gas stream is preferably air, more preferably air at ambient temperature.

Any gas directing means of the type known in the art may be employed. For example, a gas directing means may be employed which allows a concentric ring of gas to converge at or near the point at which the fiberizing composition is extruded from the aperture. It is preferred to employ a gas directing means which is similar to the concentric ring with the exception that the ring is solid except for three holes, each 120° from the other two on the ring, so that three gas streams are set to converge at or near the point where the composition is extruded from the aperture. Preferably the angle of the converging gas is from about 30° to about 60°. At least part of the solvent in the composition is removed by the gas stream, and the rate of removal may conveniently be controlled by mixing the gas with vapor of the solvent. While the relative humidity of the entering gas stream may vary widely, the relative humidity of the entering gas stream advantageously is less than about 40 percent. Preferably, the relative humidity is less than about 20 percent. Excessive amounts of water in the drying gas typically are undesirable, especially in the preparation of MgO fibers, as it may cause the green fibers to lose their shape.

The velocity of the gas stream may be varied over wide limits, but we prefer to use velocities in the region of 200 to 1500 feet per second. The pressure employed to extrude the composition through the apertures will depend on the viscosity of the composition and on the desired rate of extrusion. We find that pressures from 1 to 100 pounds per square inch absolute are convenient for compositions having viscosities up to about 100 poise.

The green fibers produced by blowing are generally of small diameter, typically up to about 50 microns, and are generally in discontinuous lengths. The green fibers may, however, have very high ratios of length to diameter, for example greater than 5000. The diameter of the green fibers may be varied by means known in the art such as, for example, by adjusting the aperture size or the gas flow rate. The fibers may be collected as individual fibers or they may be collected in the form of a yarn, mat or felt. If desired the fibers may be bonded together, for example by collecting the fibers before they are dry and heating the resultant mat or felt. Bonding of the fibers may be effected by the use of a binding agent.

The strength of the green fiber optionally may be improved by polymerizing the acrylate moieties of the green fiber as it is being formed. Any well-known method of polymerizing acrylate moieties may be employed. For example, heat or UV light may be employed in conjunction with known free radical polymerization initiators, such as peroxides, to polymerize the green fiber. Said polymerization has the further advantage of eliminating or lessening the effect of moisture on the green fiber.

The metal acrylate may be prepared by any convenient method. For example, in the preparation of MgO fibers, it is preferred to slowly add acrylic acid to an aqueous solution of magnesium hydroxide to form an aqueous solution of magnesium acrylate. In preparing the metal acrylate it is preferred to employ stoichiometric amounts of each reactant. For example, it is preferred that 2 moles of acrylic acid be employed per mole of magnesium hydroxide in the preparation of magnesium acrylate.

It is preferred that the aqueous metal acrylate solution be saturated. As is well-known, the point of saturation is indicated by crystal formation.

The fiberizing composition may conveniently be prepared by dissolving the metal compound and the organic polymer in the solvent. The order in which dissolution is carried out is not usually critical, and may be chosen for maximum convenience in each embodiment. An aqueous sol may conveniently be made by hydrolysis or heating of an aqueous solution of the metal compound. The metal compound or the organic polymer may be from a suitable precursor, usually in the presence of the solvent. It may be convenient to concentrate the solution, preferably after filtration to remove solid matter, for example by evaporation of part of the solvent, to achieve the required viscosity for fiberizing. Optionally the fiberizing composition may be de-aerated before fiberizing.

It is preferred to remove solvent from the fibers formed on fiberizing by evaporation, for example, by heating at a temperature from 30° C. to 110° C., optionally under reduced pressure.

The fiber may be further heated to decompose the metal compound and/or the organic polymer to form a fiber of different composition, especially in embodiments where it is desired to form a fiber comprising a refractory metal oxide. Typically, the fiber may be heated at a temperature from 100° C. to 2000° C. for a period from 5 minutes to 24 hours. The refractory fiber formed may optionally be sintered by further heating at a temperature from 500° C. to 2000° C. for a period of, for example, 5 minutes to 4 hours. Heating for decomposition or sintering may be carried out in stages, for example in successive steps of increasing temperature.

During the fiberizing and/or the solvent removal and/or the further heating, the fiber may be subjected to tension.

Various additives may be included in the fiber, singly or in any combination, conveniently by adding them to the fiberizing composition. Additives may also be included on the surface of the fiber by any suitable treatment process. Examples of additives which may be included are:

(a) grain growth inhibitors, for example compounds of magnesium calcium or aluminum;
(b) sintering aids, for example fluorides or salts of sodium or potassium;
(c) surfactants, for example alcohols;
(d) stabilizers for the fiberizing composition, for example formic, acetic or tartaric acid;
(e) phase-change stabilizers, for example compounds of lithium, calcium, magnesium, hafnium, yttrium, the lanthanides or boric acid;
(f) compounds which improve the physical properties of a refractory fiber, for example acid oxides, especially $SiO_2$, $B_2O_3$ or $P_2O_3$ or compounds which decompose to form acid oxides;
(g) catalyst materials, for example compounds of platinum, copper, palladium, silver, ruthenium, nickel, cobalt, chromium, iron, titanium, vanadium or manganese as hereinafter described;
(h) luminescent salts, for example salts of thorium or cerium; and
(i) coloring agents, for example mordant dyes or pigments.

The fibers of the invention may be treated with a variety of materials. For example, they may be coated with a size, such as polyvinyl alcohol or stearic acid. They may be immersed in a solution of ethyl silicate, washed and heated to give a fiber containing silica. They may also be soaked in solutions of metal salts, and the treated fibers heated to give a fiber containing additional refractory metal oxide.

The invention thus provides a fiber comprising a metal compound and an organic polymer which may be in continuous or discontinuous lengths or in the form of a mat or felt. The proportion by weight of the metal compound in the fiber is preferably greater than the proportion by weight of the organic polymer, for example when there is at least twice as much metal compound as there is organic polymer, more preferably the organic polymer comprises less than 10 percent by weight of the metal compound, for example 2 percent to 8 percent by weight, or in some embodiments from 0.1 percent to 2 percent by weight. The invention further provides a continuous, discontinuous, or felted refractory metal oxide fiber, for example a fiber comprising alumina or zirconia. Usually the fibers have a mean diameter from 0.5 to 50 microns, although the process is not restricted to the production of fibers in this range of diameter. Fibers having diameters from 0.5 to 10 microns are especially useful as they are strong and flexible. If desired, the continuous fibers may be converted into short lengths, or the fiber may be made in the first place in any convenient length.

SPECIFIC EMBODIMENTS

The following examples and comparative experiment are given to illustrate the invention and should not be construed as limiting its scope. All parts and percentages are by weight unless otherwise indicated.

EXAMPLE 1

A 50 percent solution of magnesium acrylate is prepared by reacting 466 g of magnesium hydroxide in 1050 ml of water with 1152 g of acrylic acid in a stirred, cooled reaction vessel. Acrylic acid is added slowly to the magnesium hydroxide. The temperature of the reaction mixture does not exceed 30° C. during the addition. The reaction mixture is filtered to yield a clear, slightly yellow solution.

EXAMPLE 2

A 100-g portion of the solution of Example 1 is treated with 0.1 percent $Na_2S_2O_8$ and 1.5 percent of a high molecular weight polyethylene oxide having a weight average molecular weight of approximately 400,000. The resulting viscous solution is extruded at 50 psig through a 16-mil orifice into a high velocity stream of dry nitrogen gas which elongates the extruded thread into fibers of from 30 to 40 microns in diameter and from 1 to 12 inches long. A heat gun is used to dry and polymerize the fibers as they are collected as a mat on a screen. The mat of fibers is dried at 150° C. for one hour, placed in a furnace, and is heated to 1200° C. over a three-hour period. After sintering at 1200° C. for 2 hours, the fiber mat was allowed to cool slowly overnight to room temperature. A mat of pure white, brittle fiber is obtained. The diameter of the fibers is approximately 20 microns.

COMPARATIVE EXPERIMENT 1

(Not an Embodiment of the Present Invention)

A saturated aqueous solution of magnesium acetate is prepared in a manner similar to that of Example 1. The saturated solution is viscous and has an appearance resembling molten glass. No viscosifying polymer is added to the solution, as polyethylene oxide, polyvinyl alcohol and similar polymers do not go into solution with the saturated aqueous magnesium acetate.

A saturated solution of magnesium acetate is partially fiberized by passing it through an atomizing spray nozzle using a dry $N_2$ gas stream. The atomizing spray nozzle consists of an orifice (20 mil) through which a warm (40° C.-50° C.) magnesium acetate solution may be extruded, and a ring assembly which allows high velocity gas to pass concentrically around the orifice. As magnesium acetate is extruded under ~30 psig pressure through the orifice, the solution is picked up by the high velocity, dry $N_2$ gas and is blown into a mist of fibers and droplets which are collected as a mat on a screen mounted ~2 ft from the spray nozzle. By proper control of magnesium acetate flow rate and atomizing gas velocity, a mixture of droplets, 5–20μ in diameter, and fibers, 5–25 mm long and 5–15μ in diameter, are produced. The fibers are dried at 150° C. for 2 hours and fired at 1200° C. for 2 hours.

The resulting magnesium oxide fibers are very brittle and friable. Attempts to improve the physical properties of these fibers by varying heating time from 1-6 hours and the sintering time at 1200°–1400° C. from 1–4 hours are unsuccessful.

As previously mentioned, the preceding examples and comparative experiment serve only to illustrate the invention and its advantages, and they should not be interpreted as limiting since further modifications of the disclosed invention will be apparent to those skilled in the art. All such modifications are deemed to be within the scope of the invention as defined by the following claims.

What is claimed is:

1. A process for the preparation of magnesium oxide fibers, which comprises:
   (a) preparing a composition comprising a solution of a polymerization initiator, a water-soluble organic polymer and a magnesium acrylate of the formula:

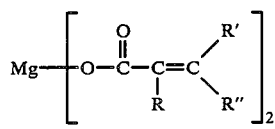

wherein R, R' and R" are independently lower alkyl, inertly substituted lower alkyl, or H, the proportion by weight of the magnesium acrylate being greater than the proportion by weight of the organic polymer;
   (b) preparing a green fiber from the composition of (a) and polymerizing the acrylate moieties of the green fiber; and
   (c) treating the green fiber under conditions such that the organic matter is removed from the fiber and a magnesium oxide fiber is produced.

2. The process of claim 1 wherein the water-soluble organic polymer is polyethylene oxide and R, R' and R" are independently H or lower alkyl of from 1 to about 3 carbon atoms.

3. The process of claim 2 wherein R, R', and R" are all hydrogen.

4. The process of claim 3 wherein the polymerization initiator is $Na_2S_2O_8$.

5. The process of claim 3 wherein the green fiber is polymerized by heat or light.

6. The process of claim 1 wherein the acrylate is prepared from stoichiometric amounts of magnesium hydroxide and acrylic acid.

7. The process of claim 1 wherein the water-soluble organic polymer is polyethylene oxide.

8. The process of claim 1 wherein the polymerization initiator is $Na_2S_2O_8$.

9. The process of claim 1 wherein the green fiber is polymerized by heat or light.

* * * * *

UNITED STATES PATENT AND TRADEMARK OFFICE
CERTIFICATE OF CORRECTION

PATENT NO. : 4,533,508
DATED : August 6, 1985
INVENTOR(S) : Rex R. Stevens

It is certified that error appears in the above-identified patent and that said Letters Patent is hereby corrected as shown below:

Claim 5, line 2, insert --UV-- between "or" and "light".

Claim 9, line 2, insert --UV-- between "or" and "light".

Signed and Sealed this

Seventeenth Day of June 1986

[SEAL]

Attest:

DONALD J. QUIGG

Attesting Officer

Commissioner of Patents and Trademarks